United States Patent
Slezak

(10) Patent No.: US 6,961,665 B2
(45) Date of Patent: Nov. 1, 2005

(54) POWER MANAGEMENT MECHANISM FOR LOOP POWERED TIME OF FLIGHT AND LEVEL MEASUREMENT SYSTEMS

(75) Inventor: Marian Jozef Walter Slezak, Rijsbergen (NL)

(73) Assignee: Siemens Milltronics Process Instruments Inc., Peterborough (CA)

( * ) Notice: Subject to any disclaimer, the term of this patent is extended or adjusted under 35 U.S.C. 154(b) by 70 days.

(21) Appl. No.: 10/675,331

(22) Filed: Sep. 30, 2003

(65) Prior Publication Data

US 2004/0124854 A1 Jul. 1, 2004

(30) Foreign Application Priority Data

Sep. 30, 2002 (CA) ............................................. 2406298

(51) Int. Cl.[7] .......................... G06F 19/00; G01S 13/00
(52) U.S. Cl. .......................... 702/61; 702/62; 702/143; 702/159
(58) Field of Search ................................ 702/142, 143, 702/60, 61, 62, 149, 156, 158, 159; 324/644; 73/290 R, 866; 342/124, 173, 174, 175

(56) References Cited

U.S. PATENT DOCUMENTS 5,079,751 A * 1/1992 Woodward ................... 367/96
5,609,059 A * 3/1997 McEwan .................. 73/290 R
5,610,611 A * 3/1997 McEwan ...................... 342/89
6,295,018 B1 * 9/2001 Diede et al. ................ 342/124
6,825,798 B2 * 11/2004 McGregor .................. 342/124

OTHER PUBLICATIONS

U.S. Appl. No. 10/674,614, filed Sep. 20, 2003, Adam Lomas.
U.S. Appl. No. 10/674,846, filed Sep. 29, 2003, Graham D. Wall.
U.S. Appl. No. 10/672,582, filed Sep. 25, 2003, Frank Daigle.
U.S. Appl. No. 10/683,198, filed Oct. 10, 2003, Quiton Lyon.

* cited by examiner

Primary Examiner—Bryan Bui
(74) Attorney, Agent, or Firm—Workman Nydegger

(57) ABSTRACT

A loop powered level measurement and time of flight ranging system with power management. The level measurement system includes a controller, a transducer for distance ranging, a power supply, and a power management stage. The power management stage comprises a shunt current regulator and a circuit for charging a storage capacitor. The shunt current regulator shunts excess current from the current loop and the circuit charges the storage capacitor. The charging of the capacitor is monitored and stored energy is applied to the transducer to make a level measurement. During charging, the controller continues to operate a user interface and communication module.

14 Claims, 4 Drawing Sheets

US 6,961,665 B2

POWER MANAGEMENT MECHANISM FOR LOOP POWERED TIME OF FLIGHT AND LEVEL MEASUREMENT SYSTEMS

RELATED APPLICATION

This application claims the benefit under 35 U.S.C. §119 of foreign patent application Ser. No. 2,406,298 filed on Sep. 30, 2002 in Canada, which is incorporated herein by reference.

FIELD OF THE INVENTION

The present invention relates to time of flight ranging systems and level measurement systems, and more particularly to a power management mechanism and technique for loop powered level measurement systems.

BACKGROUND OF THE INVENTION

Loop powered level measurement systems operate on a 4–20 mA current loop, hence the name loop powered. The circuitry for the level measurement system, i.e. the load, is typically designed to operate at less than 4 mA. The current loop provides a terminal voltage in the range 12–30V, but is nominally 24V.

To take a measurement, power is applied to the transducer and the reflected pulses are detected and the distance to the reflective surface is calculated or measured. If more than 4 mA is needed to make a measurement, then energy taken from the current loop is stored until there is enough to make the measurement. In addition, to make rapid measurements, more current from the loop is also needed. As the current in the loop increases, the speed of measurement also increases. Since the power available from the current loop is less than the power required to continuously operate the level measurement device, the level measurement device is operated intermittently. In a typical level measurement system, measurements are taken once every second up to once every five seconds.

Accordingly, there remains a need for power management in the field of loop powered level measurement or time of flight ranging systems.

BRIEF SUMMARY OF THE INVENTION

The present invention provides a mechanism and method for power management in a level measurement or time of flight ranging system.

In a first aspect, the present invention provides a level measurement system, the level measurement system is powered by a two wire loop, the level measurement system comprises: (a) a transducer for emitting energy pulses and detecting reflected energy pulses; (b) a controller having a component for controlling the transducer, and a component for determining a level measurement based on the time of flight of the reflected energy pulse; (c) a power supply having an input port for receiving power from the loop, and a component for producing an output voltage; (d) a power management unit coupled to the loop, the power management unit having an output coupled to a storage capacitor for charging the storage capacitor, an input port for receiving excess power from the loop; (e) the transducer including an input for receiving energy from the storage capacitor under the control of the controller.

In another aspect, the present invention provides a level measurement system, the level measurement system is powered by a current loop, the level measurement system comprises: (a) a transducer for emitting energy pulses and detecting reflected energy pulses; (b) a controller with a component for controlling the transducer, and a component for determining a level measurement based on the time of flight of the reflected energy pulse; (c) a power supply having an input port coupled the current loop for receiving current at a voltage level, and the power supply having a component for producing an output voltage for powering the controller; (d) a power management unit coupled to the current loop, the power management unit having an output coupled to a storage capacitor for charging the storage capacitor, an input port for receiving excess current from the current loop; (e) the transducer includes an input for receiving energy from the storage capacitor under the control of the controller.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings, which show, by way of example, embodiments of the present invention and in which.

DETAILED DESCRIPTION OF THE PREFERRED EMBODIMENT

Figure 1:
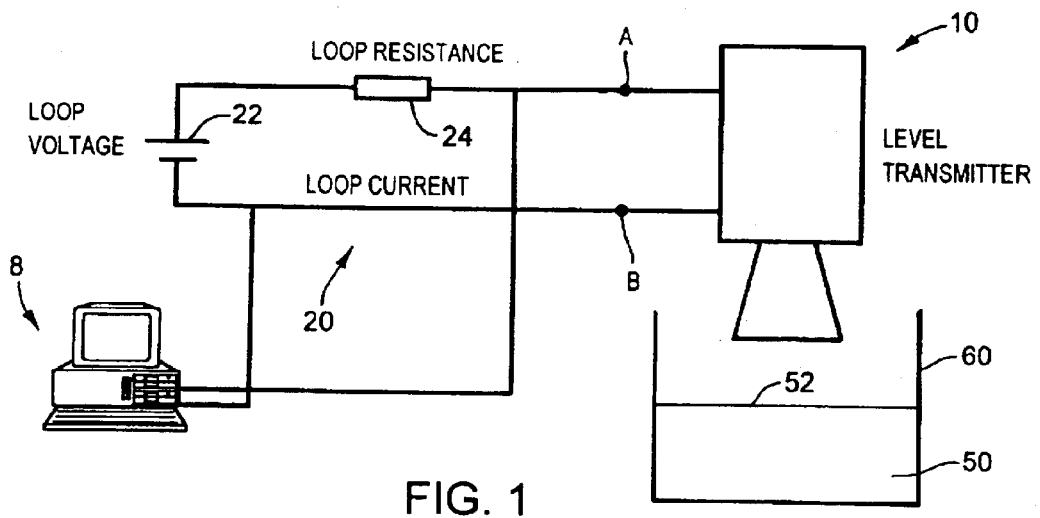
FIG. 1 shows in diagrammatic form a loop powered level measurement system and power management mechanism according to the present invention.

Reference is first made to FIG. 1 which shows a loop powered level measurement system with power management according to the present invention. The loop powered level measurement system, indicated generally by reference 10, interfaces to a power/communication loop 20, for example a 4–20 mA current loop. The loop powered level measurement system 10 is coupled to the current loop 20 at terminals A and B. A remote receiver, for example a plant control computer, indicated by reference 8 is coupled at the other end of the current loop 20. For a typical 4–20 mA current loop configuration, the loop 20 provides a current in the range 4 to 20 mA and a loop voltage in the range 18 to 30 Volts. The loop voltage is nominally at 24 Volts and represented as a voltage source with reference 22. The resistance of the loop is represented as a resistive element 24 and is typically in the range 0 to 550 Ohms. While the loop current is normally in the range 4 to 20 mA, the current may range from 3.6 to 21.6 mA to indicate alarm conditions.

Figure 2:
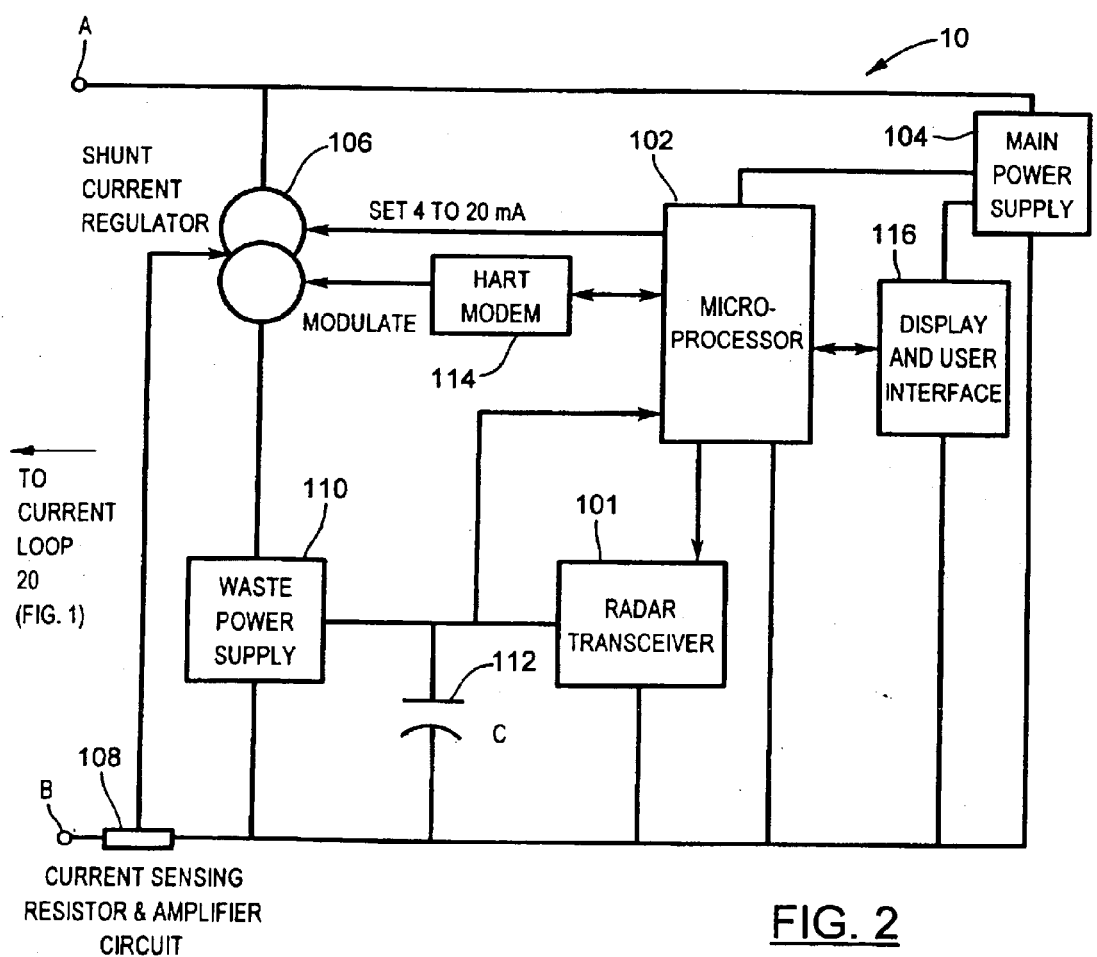
FIG. 2 shows in block diagram form the loop powered level measurement system according to the present invention.

Reference is next made to FIG. 2 which shows in more detail the level measurement system with power management 10 according to the invention. The level measurement system 10 comprises a transducer module 101, a controller 102, a power supply 104, a shunt current regulator 106, a loop current sensor and amplifier circuit 108, a power management module 110 and an energy storage capacitor 112. The level measurement system 10 may also include a communication module 114.

The power supply 104 comprises a switching power supply and is designed to consume less than the minimum loop current, nominally 4 mA.

Figure 4:
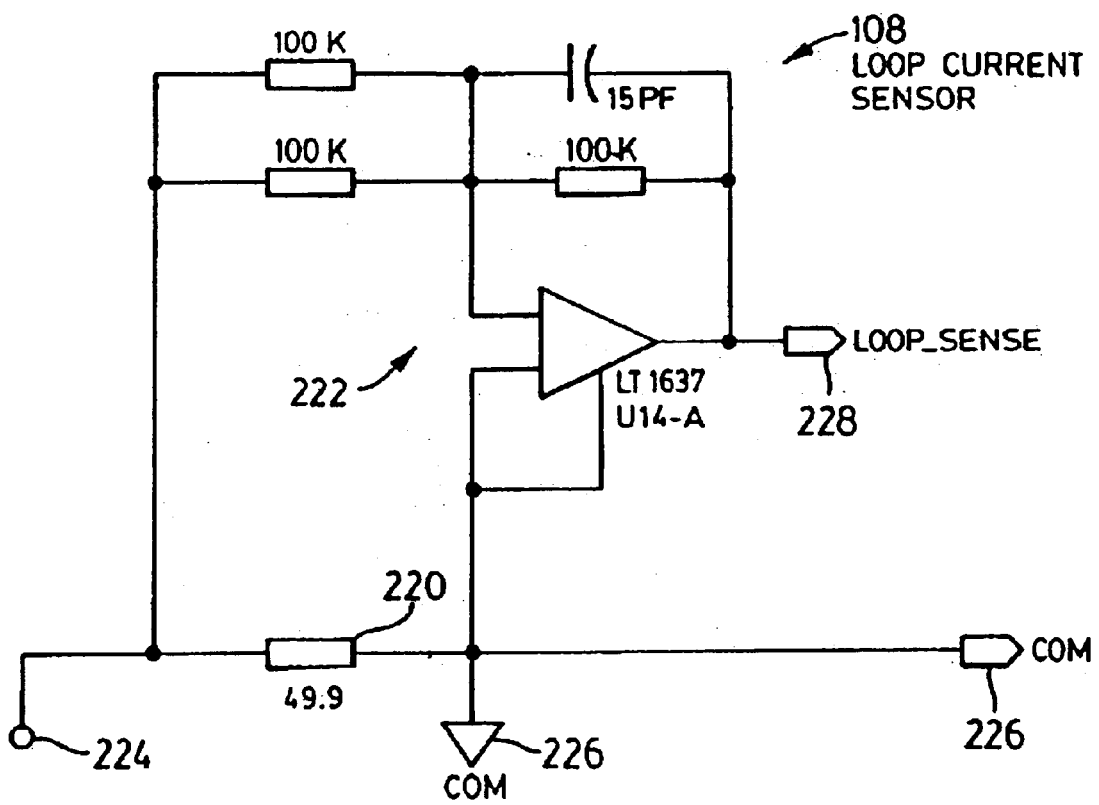
FIG. 4 shows in schematic form a circuit implementation for the waste power supply module.

The shunt current regulator 106 is operated under firmware control by the controller 102 to draw additional current to achieve the desired current in the current loop 20. One terminal of the shunt current regulator 106 is connected to terminal A of the current loop 20 and the input to the power supply 104. The other terminal of the shunt current regulator 106 is coupled to the power management module 110. The shunt current regulator 106 has a control terminal which is coupled to a control output port on the controller 102. The shunt current regulator 106 is also used by the power management module 110 to charge the storage capacitor 112 as described in more detail below. The loop current sensor and amplifier circuit 108 senses the current flowing in the loop 20 and provides feedback for the shunt current regulator 106 and the controller 102. The loop current sensor and amplifier circuit 108 may be implemented with a current sensing resistor and an amplifier as shown in FIG. 4.

As shown in FIG. 2, the level measurement system 10 also includes a user interface module 116. The user interface module 116 comprises a display, for example, a LCD module, and a keypad or touch sensitive overlay on the LCD.

The transducer module 101 is coupled to a control port and input/output port on the controller 102. The transducer module 101 includes a transducer, a transmitter stage and a receiver stage (not shown). The transducer (not shown) may comprise radar-based technology, ultrasonic-based technology, TDR-based technology (time domain reflective), or other distance ranging technology. Under the control of a program stored in memory (e.g. firmware), the controller 102 generates a transmit pulse control signal for the transmit stage in the transducer module 101, and the transducer (not shown) emits a transmit burst of energy, for example, radar pulses directed at the surface of a material 50 (FIG. 1) contained in a storage vessel 60 (FIG. 1). The reflected or echo pulses, i.e. the propagated transmit pulses reflected by the surface 52 of the material 50 (FIG. 1), are coupled by the transducer, for example, a radar antenna or other distance ranging technology (not shown), in the transducer module 101 and converted into electrical signals by the receiver stage (not shown). The electrical signals are inputted by the controller 102 and sampled and digitized by an A/D converter (not shown) and a receive echo waveform or profile is generated. The controller 101 executes an algorithm which identifies and verifies the echo pulse and calculates the range, i.e. the distance to the reflective surface, from the time it takes for the reflected energy pulse to travel from the reflective surface 52 (FIG. 1) to the transducer (not shown) in the transducer module 101. From this calculation, the distance to the surface of the material 50 and thereby the level of the material 50 in the vessel 60 is determined. The controller 101 may comprise a microprocessor or a microcontroller with on-chip resources, such as an A/D converter, ROM (EPROM), RAM. The microprocessor or microcontroller is suitably programmed to perform these operations as will be within the understanding of those skilled in the art.

Referring to FIG. 2, all power for the operation of the level measurement system 10 is derived from the current loop 20. The power supply module 104 comprises a switching power supply which takes its power input from the current loop 20 and generates the appropriate voltage levels, e.g. supply rails, for the circuitry, i.e. the controller 102, the display and user interface module 106 and the other electronic modules in the level measurement system 10. The transducer module 101 is powered from the waste power supply 110 as described in more detail below.

The controller module 102 also controls the transmission of data and control signals through the interface with the current loop 20. The controller 102 uses the shunt current regulator 106 to adjust or modulate the loop current in the range 4 to 20 mA to transmit the calculated level of the material 50 to the remote receiver or plant computer 8 (FIG. 1) connected to the other end of the current loop 20 (FIG. 1). As shown in FIG. 2, the level measurement system 10 may include the communication module 114. The communication module 114 includes a digital communication modem, for example a HART modem, which provides another communication channel between the controller 102 and the remote computer 8 (FIG. 1) over the wires of the current loop 20.

In operation, the user interface module 116 comprising the display module and the keypad, and the digital communication module 114 are run continuously. The display, user interface and communication operations may be thought of as primary functions which run continuously. The transducer module 101 is operated intermittently to transmit energy pulses and detect reflected energy pulses from the surface of the material 50 contained in the vessel 60.

The power available from the current loop 20 for the level measurement system 10 is given by:

(loop voltage−(loop current×loop resistance))×loop current

In order to achieve the fastest operation rate, all available power from the current loop 20 is utilized by the level measurement system 10.

The power management module 110 functions to tap excess power, e.g. loop current>main power supply 104, from the current loop 20, as will be described in more detail below. As shown in FIG. 2, the power management module 110 is coupled to the storage capacitor 112 and the shunt current regulator 102.

The power management module 110 uses the shunt current regulator 102 to charge the storage capacitor 112. The power supply 104 is designed to operate at less than the lower current loop limit, for example, 3 mA, which means that at least 1 mA of loop current is shunted by the shunt current regulator 106 and to the power management module 110 to charge the storage capacitor 112. As shown, the controller 102 has an input port coupled to the storage capacitor 112. The controller 102 senses the voltage on the storage capacitor 112. When the voltage level on the capacitor 112 is sufficient to power the transducer module 101, the controller 102 activates the transducer 101 to perform a level measurement for the vessel 60 (FIG. 1). The controller 102 then deactivates the transducer module 101 and the capacitor 112 is allowed to recharge using the power management module 110. The level measurement calculated by the controller 102 is transmitted to the remote computer 8 (FIG. 1) as a communication task for the primary functions. It is not necessary to turn off the controller 102 between measurements, and the controller 102 continues to execute the refresh operation and keypad scan functions for the user interface module 116, and the communication function.

Figure 3:
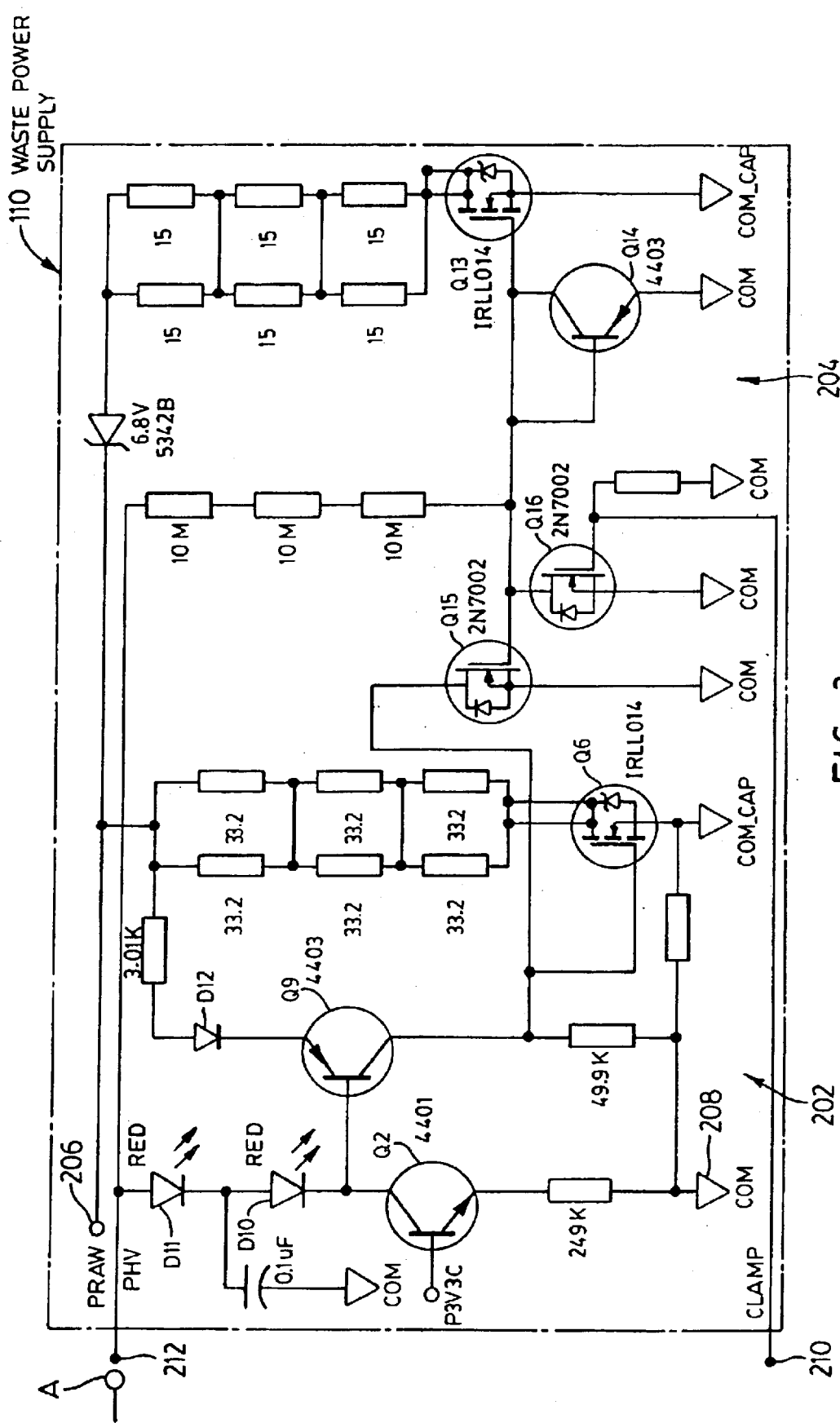
FIG. 3 shows in schematic form an implementation for the power management circuitry the level measurement system in FIG. 2.

Reference is next made to FIG. 3, which shows in schematic form a circuit implementation for the waste power supply module 110. As shown in FIG. 3, the waste power supply 110 comprises a regulator circuit 202 and a clamp circuit 204. In the waste power supply 110, terminal 206 (PRAW) is coupled to the shunt regulator 106 (FIG. 2) and the storage capacitor 112 (FIG. 2). Terminals 208 (COM) are connected to the common rail (COM) for the system 10. One terminal of the loop current sensor 108 (FIG. 2, FIG. 4). Terminal 210 (CLAMP*) is coupled to the controller 102 (FIG. 2), and driven by the controller 102 during start-up. Terminal 212 (PHV) is coupled to terminal A (FIG. 1).

In operation, the regulator circuit 202 tries to maintain PRAW, i.e. terminal 206, approximately 2 Volts below PHV, i.e. terminal 212. As the voltage on PRAW drops to 2 Volts less than the voltage on PHV, diodes D10 and D11 begin to turn off, which causes transistors Q9 and Q6 to turn. With the transistors Q6 and Q9 on, the impedance between PRAW and COM_CAP is reduced. This tends to increase the voltage difference between PRAW and PHV, thereby maintaining an approximate 2 Volt difference between PRAW and PHV.

In the operation of the clamp circuit 204, when the terminal 210, i.e. CLAMP*, is LOW, resistors R31 to R36 connected in series with diode D13 are coupled across terminal A and the common rail COM. This provides a load while the controller 102 is starting up or initializing. The terminal 210 or CLAMP* is maintained low during start up, and when CLAMP* is high the load from resistors R31–R36 is disconnected. This load on start up is provided to ensure a current draw greater than 22.6 mA from the current loop 20.

Reference is next made to FIG. 4 which shows a circuit implementation for the loop current sensor and amplifier circuit 108. The loop current sensor and amplifier circuit 108 comprises a resistor 220 and an operational amplifier circuit 222. The loop current sensor 108 has terminal 224 (NEG), terminal 226 (COM), and output terminal 228 (LOOP_SENSE). The NEG terminal 224 is coupled to terminal B (FIG. 2) and the current loop 20 (FIG. 1). The COM terminal 226 is connected to the common or return supply rail. The LOOP_SENSE terminal 228 provides the output for the loop current sensor 108 and is formed from the output of the operational amplifier in the circuit 222. The LOOP_SENSE terminal is coupled to an input on the shunt current regulator 106 as shown in FIG. 5.

Figure 5:
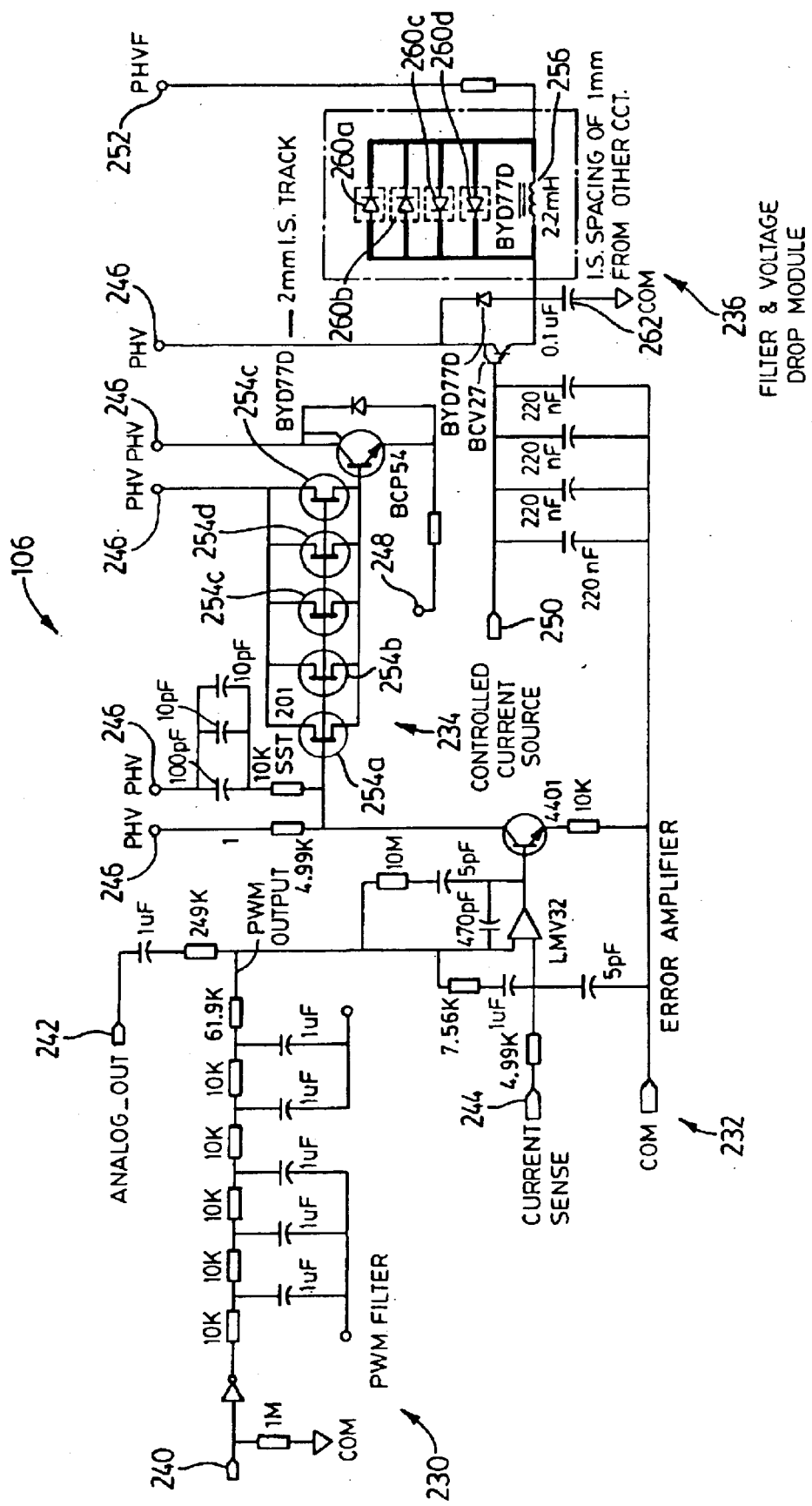
FIG. 5 shows in schematic form a circuit implementation for the shunt current regulator.

Reference is next made to FIG. 5, which shows a circuit implementation for the shunt current regulator 106. The shunt current regulator 106 as shown in FIG. 5 comprises a Pulse Width Modulator (PWM) circuit 230, an error amplifier circuit 232, a controlled current source 234, and a filter and voltage drop circuit 236.

The PWM filter circuit 230 has an input terminal (PWM) 240, and an output terminal (ANALOG_OUT) 242. The PWM terminal 240 is coupled to an output port on the controller 102 (FIG. 2) which is used to set the current level, i.e. between 4 to 20 mA. The ANALOG_OUT terminal 242 is coupled to the "Modulate" signal port on the HART modem 114 (FIG. 2). In operation, the PWM filter circuit 230 low pass filters the PWM signal on the input terminal 240 to produce a DC voltage, i.e. PWM output, which is proportional to the duty ratio or duty cycle of the PWM signal received from the controller 102 (FIG. 2).

The error amplifier circuit 232 has an input terminal (CURRENT_SENSE) 244, terminal (PHV) 246, terminal (PRAW) 248, and terminal (PHFV) 250. The CURRENT_SENSE input terminal 244 is coupled to the LOOP_SENSE output terminal 228 (FIG. 4) from the loop current sensor 108. The PHV terminal 246 is coupled to the terminal A (FIG. 2). The error amplifier circuit 232 amplifies the difference between the actual current, i.e. as indicated by the input CURRENT_SENSE 244, and the requested current, i.e. the PWM output from the PWM filter circuit 230 which is generated from the input PWM 240. This difference is used in the feedback loop to control the loop current.

The controlled current source circuit 234 is coupled to the output of the error amplifier 232. The controlled current source 234 is connected to the PHV terminal 246. The controlled current source 234 also includes terminal (PRAW) 248. The PRAW terminal 248 connects to the corresponding PRAW terminal 206 in the waste power supply 110 (FIG. 3). As shown the controlled current source circuit 234 includes a number of JFET transistors 254, indicated individually as 254a, 254b, 254c, 254d, 254e which are coupled in parallel. The parallel arrangement of the JFET transistors 254 allows for higher saturation currents.

The filter and voltage drop circuit 236 is coupled to terminal PHV 246 and includes a BIAS terminal 250 and a terminal (PHVF) 252. As also shown, the filter and voltage drop circuit 236 includes an inductor (L11) 256, a diode circuit 258 comprising diodes 260a, 260b, 260c, 260d, and a capacitor (C65) 262. The arrangement of the inductor 256 and the capacitor 262 filters noise arising from the power supply 104 from feeding back in the current loop. The diode circuit 258 is provided for clamping the inductor 256 for intrinsically safe, i.e. I.S., applications as required. The remainder of the circuit 236 as shown in FIG. 5 provides a voltage drop of approximately 0.7 Volts between the PHV terminal 246 and the PHVF terminal 252 as required for operation of the HART modem 114 (FIG. 2).

In operation, the less current the main power supply 104 draws from the loop 20, the more loop current flows to the shunt current regulator 106 and to the power management module 110 for faster charging of the storage capacitor 112. The faster the charging of the capacitor 112, the shorter the level measurement cycle. To improve charging efficiency, the power supply 104 is implemented as a switching power supply in the level measurement system 10. This means that as the loop voltage increases, the loop current drawn by the power supply 104 decreases resulting in an increase in the loop current to the shunt current regulator 106 and the power management module 110 for faster charging of the storage capacitor 112.

To further improve the charging efficiency of the storage capacitor 112, the microprocessor or microcontroller for the controller 102 may be operated at a slower clock speed, e.g. under control of the firmware and the instruction set specific to the microprocessor device. The microprocessor requires less current when operating at a slower clock speed. The primary functions, such as display, user interface and communications, can be performed at the slower clock speeds.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A level measurement system, said level measurement system being powered by a two wire loop, said level measurement system comprising:
   (a) a transducer for emitting energy pulses and detecting reflected energy pulses;
   (b) a controller having a component for controlling said transducer, and a component for determining a level measurement based on the time of flight of said reflected energy pulse;
   (c) a power supply having an input port for receiving power from the loop, and a component for producing an output voltage;
   (d) a power management unit coupled to the loop, said power management unit having an output coupled to a storage capacitor for charging said storage capacitor, an input port for receiving excess power from the loop, a control terminal responsive to a control output from said controller for controlling the charging of said storage capacitor;
   (e) said transducer including an input for receiving energy from said storage capacitor under the control of said controller.

2. The level measurement system as claimed in claim 1, wherein said power management unit includes a control terminal responsive to a control output from said controller for controlling the charging of said storage capacitor.

3. The level measurement system as claimed in claim 1 or 2, further including a user interface module and a communication module for transmitting level measurement data over the two wire loop.

4. The level measurement system as claimed in claim 3, wherein said controller operates said transducer intermittently and based on the charging of said storage capacitor.

5. The level measurement system as claimed in claim 4, wherein said controller operates said user interface module and said communication module continuously.

6. The level measurement system as claimed in claim 5, wherein said power supply comprises a switching power supply, and wherein the two wire loop comprises a current loop operable between a minimum current level and a maximum current level, and said switching power supply operating at current level less than said minimum current level, and the difference in the current levels being directed to said power management unit for charging said storage capacitor.

7. A level measurement system, said level measurement system being powered by a current loop, said level measurement system comprising:
   (a) a transducer for emitting energy pulses and detecting reflected energy pulses;
   (b) a controller having a component for controlling said transducer, and a component for determining a level measurement based on the time of flight of said reflected energy pulse;
   (c) a power supply having an input port coupled to the current loop for receiving current at a voltage level, and said power supply having a component for producing an output voltage for powering said controller;
   (d) a power management unit coupled to the current loop, said power management unit having an output coupled to a storage capacitor for charging said storage capacitor, an input port for receiving excess current from the current loop;
   (e) said transducer including an input for receiving energy from said storage capacitor under the control of said controller.

8. The level measurement system as claimed in claim 7, wherein said power management unit includes a control terminal responsive to a control output from said controller for controlling the charging of said storage capacitor.

9. The level measurement system as claimed in claim 7 or 8, wherein said power supply comprises a switching power supply and said switching power supply operates at a current level below the operating current level for the current loop, and said power management unit utilizes the difference in said current levels for charging said storage capacitor under the control of said controller.

10. The level measurement system as claimed in claim 9, further including a user interface module and a communication module for transmitting level measurement data over the current loop.

11. The level measurement system as claimed in claim 10, wherein said controller operates said transducer intermittently and based on the charging of said storage capacitor.

12. The level measurement system as claimed in claim 11, wherein said controller operates said user interface module and said communication module continuously.

13. The level measurement system as claimed in claim 12, wherein said power management unit comprises a shunt current regulator coupled to the current loop, and having control terminal responsive to a control output from said controller for shunting current from the current loop.

14. The level measurement system as claimed in claim 13, wherein said power management unit comprises a current sensor coupled to the current loop and having an output for indicating the current level in the current loop.

* * * * *